US010543525B2

(12) United States Patent
Fantazian et al.

(10) Patent No.: US 10,543,525 B2
(45) Date of Patent: Jan. 28, 2020

(54) METHOD OF VERIFYING THAT SELF-PIERCING RIVET GUN IS NORMAL TO WORKPIECES

(71) Applicants: George Fantazian, White Lake, MI (US); John Macdonald, White Lake, MI (US); Doan R Whitt, White Lake, MI (US)

(72) Inventors: George Fantazian, White Lake, MI (US); John Macdonald, White Lake, MI (US); Doan R Whitt, White Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 71 days.

(21) Appl. No.: 15/907,668

(22) Filed: Feb. 28, 2018

(65) Prior Publication Data
US 2019/0262892 A1 Aug. 29, 2019

(51) Int. Cl.
*B21J 15/00* (2006.01)
*B21J 15/28* (2006.01)
*G01B 5/245* (2006.01)
*B21J 15/02* (2006.01)

(52) U.S. Cl.
CPC ............... *B21J 15/28* (2013.01); *B21J 15/00* (2013.01); *B21J 15/025* (2013.01); *G01B 5/245* (2013.01)

(58) Field of Classification Search
CPC .......... B21J 15/28; B21J 15/025; G01B 5/245
See application file for complete search history.

(56) References Cited

U.S. PATENT DOCUMENTS

| 5,752,305 A | 5/1998 | Cotterill et al. |
| 6,567,725 B1 | 5/2003 | Wilkey et al. |
| 8,636,313 B2 | 1/2014 | Huelke et al. |
| 9,339,899 B2 | 5/2016 | Doo et al. |
| 9,839,973 B2 * | 12/2017 | Okada ................ B23K 20/1245 |
| 2005/0086799 A1 | 4/2005 | Kato et al. |

OTHER PUBLICATIONS

GI India Automation And Systems Pvt Ltd, "Air Gap Sensor/Seat Check Sensors & Module", http://giindiaautomation.co.in/air-gap-sensor/ (2017).
FESTO, "Air Gap Sensors SOPA" www.festo.com/catalogue/sopa (2017).
RobotWorx, "FANUC Provides Tactile Intelligence With Force Control and Vision, Technologies" https://www.robots.com/articles/viewing/fanuc-provides-tactile-intelligence-with-force-control-and-vision-technologies (2017).

* cited by examiner

*Primary Examiner* — Rick K Chang
(74) *Attorney, Agent, or Firm* — Ralph E. Smith

(57) ABSTRACT

A method of verifying that a robot carried self-piercing rivet gun system is set-up so that workpieces that are to be riveted will be normal to a self-piercing rivet gun of the robot carried self-piercing rivet gun system during riveting includes utilizing a perpendicularity sensor to verify that the workpieces will be normal to the self-piercing gun during riveting.

3 Claims, 3 Drawing Sheets

METHOD OF VERIFYING THAT SELF-PIERCING RIVET GUN IS NORMAL TO WORKPIECES

FIELD

The present invention relates to an indicator for verifying that a robot carried self-piercing rivet gun is normal to a workpiece during set-up of the robot carried self-piercing rivet gun to verify that workpieces being riveted will be normal to the self-piercing rivet gun during riveting.

BACKGROUND

Self-piercing rivets are used to join planar portions of workpieces together, typically two aluminum workpieces. The self-piercing rivet has a pre-formed head and a shank extending from the head. A diameter of the head is larger than a diameter of the shank. The workpieces may for example be parts of an assembly, such as parts of a vehicle, that are being secured together by riveting. In this regard, a first one of the workpieces may be secured in the assembly and the other one of the workpieces is being secured in the assembly by riveting it to the first workpiece.

Robot carried self-piercing rivet guns are often used to apply the self-piercing rivet to the workpieces. FIG. 1 is a simplified drawing of a typical robot carried self-piercing rivet gun system 100. The self-piercing rivet gun system 100 has a robotic arm 102 to which a C-shaped arm 104 is affixed. The C-shaped arm 104 has opposed ends 106, 108 with a self-piercing rivet gun 110 affixed at end 106 and the other opposed end 108 having a receptacle 112 in which an upsetting die 114 is receivable. A self-piercing rivet (not shown) having a pre-formed head is fed into self-piercing rivet gun 110 and held therein. Robotic arm 102 moves the C-shaped arm so that workpieces 200, 202 (FIG. 2) to be riveted together are between the ends of the C-shaped arm. The robotic arm 102 moves the C-shaped arm 104 to bring the upsetting die 114 against a side of workpiece 200. The self-piercing rivet gun is activated to punch a shank of the self-piercing rivet through the workpieces 200, 202. An end of the shank is deformed by a forming recess 206 (FIG. 2) in an end surface 116 of the upsetting die 114 to form the end of the shank of the self-piercing rivet into an end head having a diameter that is larger than a diameter of the shank. The workpieces 200, 202 are compressed between the pre-formed head of the self-piercing rivet and the formed end head at the end of the shank which holds the workpieces 200, 202 together. The workpiece 200 that the upsetting contacts is fixed in location with respect to the robot carried self-piercing rivet gun assembly and is referred to herein as fixedly located workpiece 200. Fixedly located workpiece 200 is typically part of an assembly, such as a part of a vehicle assembly, and the other workpiece 202 is a part that is being affixed to the fixedly located workpiece 200 and that is held in place against the fixedly located workpiece 200, such as by clamping, during riveting.

It is important that the workpieces 200, 202 are normal (perpendicular) to the self-piercing rivet gun 110, and thus the rivet, when they are riveted together. Otherwise, the integrity of the riveted joint may be compromised if the rivet extends through the workpieces 200, 202 at an angle other than ninety degrees rather than perpendicular to the workpieces.

During set-up of the robotic carried self-piercing rivet gun system 100, the robotic arm 102 is programmed so that the workpieces 200, 202 will be normal to the self-piercing rivet gun 110 during riveting. This is often accomplished by controlling the robotic arm 102 to move C-shaped arm 104 to bring the upsetting die against the fixedly located workpiece 200 that the upsetting die 114 contacts and controlling the robotic arm 102 to adjust the orientation of the C-shaped arm 104 so that the fixedly located workpiece 200 lays flat against the end surface 116 of the upsetting die 114. Thus, when the C-shaped arm 104 is moved by the robotic arm 102 to bring the upsetting die 114 against the fixedly located workpiece 200, the fixedly located workpiece 200 lies flat against the end surface 116 of the upsetting die 114 and the fixedly located workpiece 200 is thus normal to the self-piercing rivet gun 110 during riveting.

The determination of whether the workpieces 200, 202 are normal to the self-piercing rivet gun 110 is typically done manually such as by a set-up operator using devices such as machine squares and the like. Whether the robotic arm is programmed properly so that the workpieces are normal to the self-piercing rivet gun 110 is thus dependent on the subjective judgment of the set-up operator, which could lead to the robotic arm 102 being programmed so that the workpieces 200, 202 are not normal to the self-piercing rivet gun 110 during riveting.

It is thus an objective of the present invention to provide an indicator that indicates whether the workpieces that are to be riveted are normal to the upsetting die during programming of the robotic self-piercing rivet gun to minimize or eliminate subjectivity in the programming of the robotic self-piercing rivet gun.

SUMMARY

In accordance with an aspect of the present disclosure, a method of verifying that a robot carried self-piercing rivet gun system is set-up so that workpieces that are to be riveted will be normal to a self-piercing rivet gun of the robot carried self-piercing rivet gun system during riveting is provided. The robot carried self-piercing gun system having a robotically moved C-shaped arm having opposed ends with the self-piercing rivet gun affixed to one of the opposed ends and the other opposed end having a receptacle in which an upsetting die is receivable. The method includes providing a perpendicularity sensor and placing the perpendicularity sensor in the receptacle. It also includes moving the C-shaped arm so that the perpendicularity sensor contacts a fixedly located workpiece, sensing with the perpendicularity sensor whether the fixedly located workpiece is flat against a flat end surface of a body of the perpendicularity sensor, having the perpendicularity sensor provide a signal activating an alert when the perpendicularity sensor senses that the fixedly located workpiece is flat against the flat end surface of the body of the perpendicularity sensor verifying that the workpieces that are to be riveted will be normal to the self-piercing rivet gun during riveting.

In accordance with an aspect, the method includes adjusting a set-up position of the C-shaped arm relative to the fixedly located workpiece until the perpendicularity sensor senses that the fixedly located workpiece is flat against the flat end surface of the perpendicularity sensor.

In accordance with an aspect, providing the perpendicularity sensor includes providing the perpendicularity sensor with a body configured to be received in the receptacle, providing the perpendicularity sensor with a micro-plunger actuated switch with a micro-plunger having an end that projects from an end of the body of the perpendicularity sensor having the flat end surface and that switches the switch to provide the alert signal when the micro-plunger is depressed to less than a predetermined distance from the end of the body of the perpendicularity sensor, and providing that the predetermined distance is a distance that the micro-plunger will be depressed to less than by the fixedly located workpiece only when the fixedly located workpiece is flat against the flat end surface of the end of the body of the perpendicularity sensor when the perpendicularity sensor is brought into contact with the fixedly located workpiece. In accordance with an aspect, providing the perpendicularity sensor includes providing that the micro-plunger will be depressed to less than the predetermined distance only when the fixedly located workpiece is within two degrees of being flat to the flat end surface of the end of the body of the perpendicularity sensor.

BRIEF DESCRIPTION OF THE DRAWINGS

The present invention will become more fully understood from the detailed description and the accompanying drawings, wherein.

DETAILED DESCRIPTION

Figure 1:
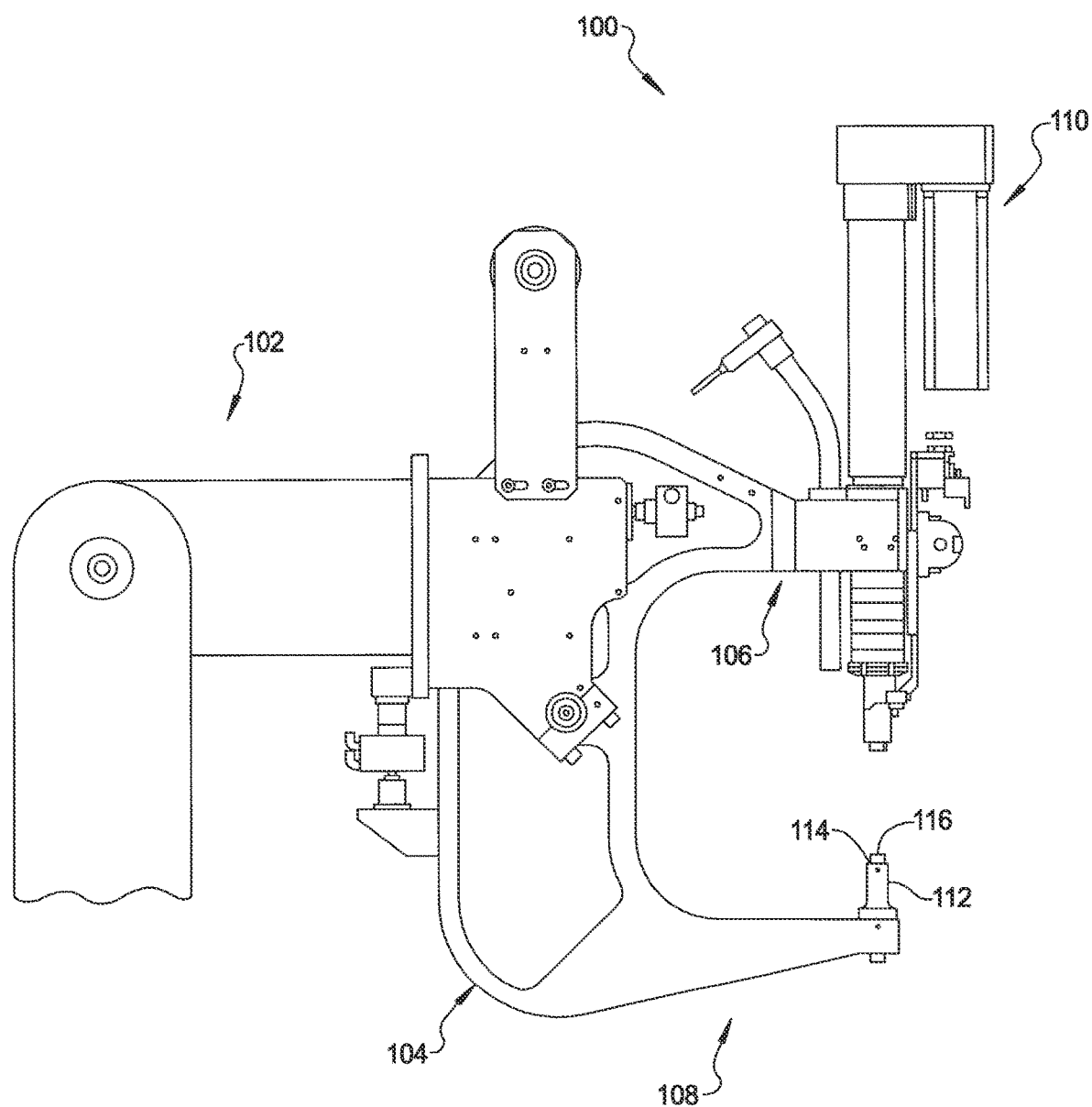
FIG. 1 is a diagram of a prior art robot carried self-piercing rivet gun system.
Figure 2:
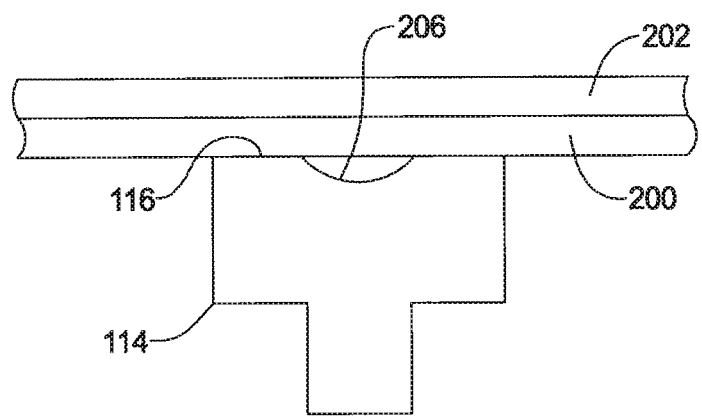
FIG. 2 is a diagrammatic view representatively showing workpieces to be riveted on an upsetting die of the robot carried self-piercing rivet gun system of FIG. 1.

The following description of the preferred embodiment(s) is merely exemplary in nature and is in no way intended to limit the invention, its application, or uses. Corresponding reference numerals indicate corresponding parts throughout the several views of the drawings.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. If, for some reason, the imprecision provided by "about" is not otherwise understood in the art with this ordinary meaning, then "about" as used herein may indicate a possible variation of up to 5% of the indicated value or 5% variance from usual methods of measurement.

In accordance with an aspect of the present disclosure, a perpendicularity sensor 300 (FIGS. 3A and 3B) is provided and utilized in the set-up of the robot carried self-piercing rivet gun system 100. Perpendicularity sensor 300 has a body 302 in which a micro-plunger actuated switch 304 is received. An end 306 of body 302 has a flat end surface 308. Body 302 is shaped to be received in receptacle 112 of opposed end 108 of C-shaped arm 104 with flat end surface 308 lying in the same plane as, or in a plane parallel to, the plane that end surface 116 of upsetting die 114 lies when upsetting die 114 is received in receptacle 112, or in a plane that is parallel to the plane that end surface 116 of upsetting die 114 lies when upsetting die 114 is received in receptacle 112. Body 302 has a micro-plunger 310 having an end 312 that projects outwardly from end 306 of body 302 from flat end surface 308. In an aspect, micro-plunger 310 is a micro-ball. The micro-plunger 310 switches a switch 314 of the micro-plunger actuated switch 304 from a first state to a second state when the micro-plunger 310 is depressed so that its end 312 is no more than a predetermined distance from the flat end surface 308 of the end 306 of body 302. It should be understood that the end 312 of micro-plunger 310 extends from the end 306 of body 302 more than the pre-determined distance when it is in a normal position where it is not depressed, and is illustratively spring loaded so that it is urged to its normal position when not depressed. This pre-determined distance is set so that the fixedly located workpiece 200 must be flat (within two degrees) against the flat end surface 308 of end 306 of body 302 of perpendicularity sensor 300 to depress the micro-plunger 310 so that the end 312 of the micro-plunger 310 is less than the pre-determined distance from the flat end surface 308 of the end 306 of body 302. When fixedly located workpiece 200 is flat against the flat end surface 308, it (and workpiece 202 that is flat against workpiece 200) the workpieces 200, 202 that are to be riveted will then be perpendicular to self-piercing rivet gun 110 during riveting. In an aspect, the predetermined distance is zero, that is, the micro-plunger 310 switches the switch 314 to its second state when the end 312 of micro-plunger 310 is even with the flat end surface 308.

It should be understood that fixedly located workpiece 200 is used during the verification process, typically without workpiece 202 also being used. For example, an assembly (not shown) having one such fixedly located workpiece 200 is selected for the verification process and the verification process performed. Assuming the verification process verifies that the fixedly located workpiece is flat against the flat end surface 308, riveting with the robot carried self-piercing rivet gun assembly proceeds with respective ones of fixedly located workpiece 200 being riveted to respective ones of workpieces 202.

Figure 3A:
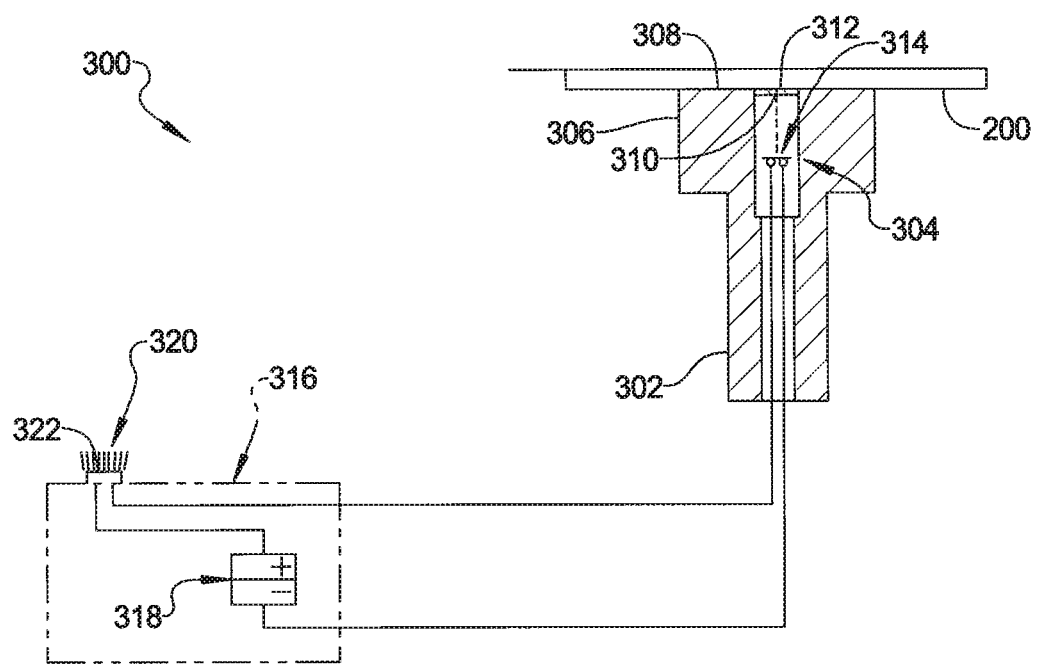
FIG. 3A is a diagrammatic view of a perpendicularity sensor in accordance with an aspect of the present disclosure showing a workpiece flat against a flat end surface of a body of the perpendicularity sensor.
Figure 3B:
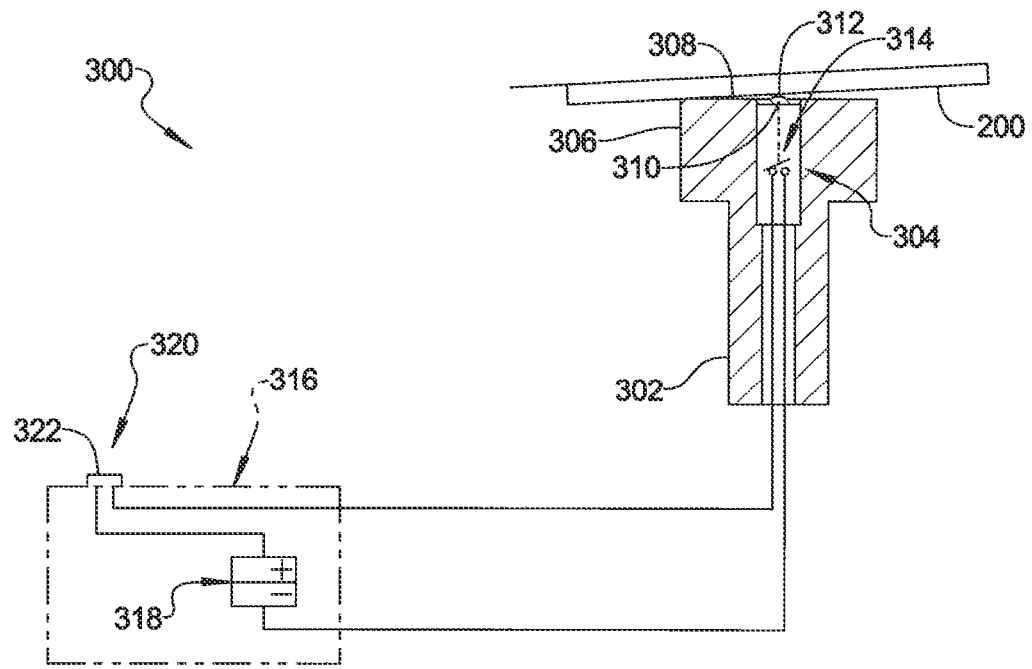
FIG. 3B is a diagrammatic view of the perpendicularity sensor of FIG. 3A showing a workpiece that is not flat against a flat end surface of a body of the perpendicularity sensor.

When switch 314 is in the second state, it provides an alert activation signal that activates an alert device 316 indicating that the fixedly located workpiece 200 is flat against the flat end surface 308 of the end 306 of the body 302 of perpendicularity sensor 300, as shown in FIG. 3A. Alert device 316 is illustratively part of perpendicularity sensor 300, but could be separate. Alert device 316 illustratively includes a power supply 318, such as a battery, and an indicator 320. In an aspect, alert device 316 is remote from body 302 of perpendicularity sensor 300 and in an aspect is incorporated in body 302 of perpendicularity sensor 300. In an aspect, indicator 320 is a LED 322 that is energized by the alert signal. It should be understood that indicator 320 can be other types of indicators, such as audible indicators, and can be multiple types of indicators, such as a LED and an audible indicator. When activated, alert device 316 alerts a set-up operator that the fixedly located workpiece 200 is flat against the flat end surface 308, as shown in FIG. 3A, which verifies that the robotic arm 102 has been programmed so that the fixedly located workpiece 200 is flat against the flat end surface 308 and the workpieces 200, 202 that are to be riveted will thus be normal to the self-piercing rivet gun 110 during riveting. If the fixedly located workpiece 200 is not flat (within two degrees) against flat end surface 308, as shown in FIG. 3B, end 312 of micro-plunger 310 will not be depressed sufficiently to switch the switch 314 to its second state. Illustratively, switch 314 is open in its first state and closed in its second state.

It should be understood that in an aspect, switch 314 also provides a second alert signal when in the first state which activates an alert (not shown) that indicates that fixedly located workpiece 200 is not flat against the flat end surface 308.

A method in accordance with an aspect of the present of disclosure of verifying that a robot carried self-piercing rivet gun system 100 is set-up so that workpieces 200, 202 that are to be riveted will be normal to self-piercing rivet gun 110 includes using the perpendicularity sensor 300 to verify that the workpieces 200, 202 will be perpendicular to self-piercing rivet gun 110 during riveting. The perpendicularity sensor 300 is placed in receptacle 112 in opposed end 108 of C-shaped arm 104. During programming of the robotic arm 102, robotic arm 102 is controlled to move the C-shaped arm 104 to bring opposed end 108 to workpiece 200 thus bringing flat end surface 308 of the 306 of body 302 of perpendicularity sensor 300 against workpiece 200. The robotic arm is also controlled to adjust the orientation of the C-shaped arm 104 end so that the flat end surface 308 is flat (within two degrees) against workpiece 200. Perpendicularity sensor 300 senses whether the workpiece 200 is flat against the flat end surface 308 and provides an alert activation signal when it senses that the workpiece 200 is flat against the flat end surface 308. More specifically, micro-plunger 310 of micro-plunger actuated switch 304 of perpendicularity sensor 300 is depressed by workpiece 200. When micro-plunger 310 is depressed by workpiece 200 so that the end 312 of micro-plunger 310 is less than the predetermined distance from flat end surface 308, micro-plunger 310 switches switch 314 from the first state to the second state and switch 314 provides the alert activation signal as discussed above that activates alert device 316. The activation of alert device 316 verifies, such as to a set-up operator, that the robotic arm 102 has been properly programmed so that workpieces 200 is flat against flat end surface 308 and verifies that workpieces 200, 202 will be normal to the self-piercing rivet gun 110 during riveting.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of verifying that a robot carried self-piercing rivet gun system is set-up so that workpieces that are to be riveted will be normal to a self-piercing rivet gun of the robot carried self-piercing rivet gun system during riveting wherein one of the workpieces is a fixedly located workpiece, the robot carried self-piercing gun system having a robotically moved C-shaped arm having opposed ends with the self-piercing rivet gun affixed to one of the opposed ends and the other opposed end having a receptacle in which an upsetting die is receivable, the method comprising:

providing a perpendicularity sensor and placing the perpendicularity sensor in the receptacle;

moving the C-shaped arm so that the perpendicularity sensor contacts the fixedly located workpiece;

sensing with the perpendicularity sensor whether the fixedly located workpiece is flat against a flat end surface of a body of the perpendicularity sensor;

having the perpendicularity sensor provide a signal activating an alert device when the perpendicularity sensor senses that the fixedly located workpiece is flat against the flat end surface of the body of the perpendicularity sensor verifying that the workpieces that are to be riveted will be normal to the self-piercing rivet gun during riveting; and providing the perpendicularity sensor includes providing the perpendicularity sensor with a body configured to be received in the receptacle, providing the perpendicularity sensor with a micro-plunger actuated switch with a micro-plunger having an end that projects from an end of the body of the perpendicularity sensor having the flat surface and that switches the switch to provide the alert signal when the micro-plunger is depressed to less than a predetermined distance from the end of the body of the perpendicularity sensor having the flat surface, and providing that the predetermined distance is a distance that the micro-plunger will be depressed to less than by the fixedly located workpiece only when the fixedly located workpiece is flat against the flat end surface of the end of the body of the perpendicularity sensor when the perpendicularity sensor is brought into contact with the fixedly located workpiece.

2. The method of claim 1 further including adjusting a set-up position of the C-shaped arm relative to the fixedly located workpiece until the perpendicularity sensor senses that the fixedly located workpiece is flat against the flat end surface of the perpendicularity sensor.

3. The method of claim 1 wherein providing the perpendicularity sensor includes providing that the micro-plunger will be depressed to less than the predetermined distance only when the fixedly located workpiece is within two degrees of being flat to the flat end surface of the end of the body of the perpendicularity sensor having the flat end surface.

* * * * *